(12) United States Patent
Merving

(10) Patent No.: US 10,342,181 B2
(45) Date of Patent: Jul. 9, 2019

(54) TREE TREATMENT CAPSULE

(71) Applicant: Mertec AB, Torshälla (SE)

(72) Inventor: Hans A. K. Merving, Torshälla (SE)

(73) Assignee: Mertec AB, Torshälla (SE)

( * ) Notice: Subject to any disclaimer, the term of this patent is extended or adjusted under 35 U.S.C. 154(b) by 732 days.

(21) Appl. No.: 15/021,106

(22) PCT Filed: Oct. 29, 2014

(86) PCT No.: PCT/SE2014/051274
§ 371 (c)(1),
(2) Date: Mar. 10, 2016

(87) PCT Pub. No.: WO2015/065277
PCT Pub. Date: May 7, 2015

(65) Prior Publication Data
US 2016/0235015 A1 Aug. 18, 2016

(30) Foreign Application Priority Data
Nov. 4, 2013 (SE) ........................................ 1351302

(51) Int. Cl.
A01G 7/06 (2006.01)
(52) U.S. Cl.
CPC ........................ A01G 7/06 (2013.01)
(58) Field of Classification Search
CPC .................................... A01G 7/00; A01G 7/06
(Continued)

(56) References Cited

U.S. PATENT DOCUMENTS 1,999,458 A * 4/1935 Hollister .................. A01G 7/06 206/0.5
3,706,161 A * 12/1972 Jenson ..................... A01G 7/06 47/57.5

(Continued)

FOREIGN PATENT DOCUMENTS

EP 0469235 A2 2/1992
EP 2066171 B1 6/2009
WO 2008039122 A1 4/2008

Primary Examiner — Monica L Williams
Assistant Examiner — Aaron M Rodziwicz
(74) Attorney, Agent, or Firm — Capitol City TechLaw

(57) ABSTRACT

A capsule (1) for insertion into a bore of a porous element to apply treatment substance to the interior of the element and having a container (2), with at least one internal cavity (3) for receiving treatment substance and an outer stop flange (8), and a plug (4) received in and fixed to the container through a common interconnecting land (5). A first container shank portion (6) that extends from a first insertion end (1A) of the capsule and up to the area of the interconnecting land has a uniform, generally cylindrical shape, a second container shank portion (7) extending away from said container first shank portion, from the area of the inter-connecting land towards the outer stop flange, at least at an inner surface (7B) thereof has an outwardly slightly diverging, conical shape and at an outer surface (7A) thereof, separated a short distance from the outer stop flange has a first circumferential beveled edge (9) serving as a transition to an outer increased diameter section (7C). A method for applying treatment substance by means of such a capsule is also provided.

12 Claims, 5 Drawing Sheets

(58) Field of Classification Search
USPC .......................................................... 47/57.5
See application file for complete search history.

(56) References Cited

U.S. PATENT DOCUMENTS

| | | | | |
|---|---|---|---|---|
| 4,308,689 A * | 1/1982 | Jenson | ..................... | A01G 7/06 |
| | | | | 215/47 |
| 4,905,410 A * | 3/1990 | Merving | .................. | A01G 7/06 |
| | | | | 47/57.5 |
| 5,010,684 A * | 4/1991 | Merving | .................. | A01G 7/06 |
| | | | | 47/57.5 |
| 5,471,784 A * | 12/1995 | Merving | .................. | A01G 7/06 |
| | | | | 47/57.5 |
| 5,485,698 A * | 1/1996 | Merving | .................. | A01G 7/06 |
| | | | | 47/57.5 |
| 5,505,021 A * | 4/1996 | Merving | .................. | A01G 7/06 |
| | | | | 47/57.5 |

* cited by examiner

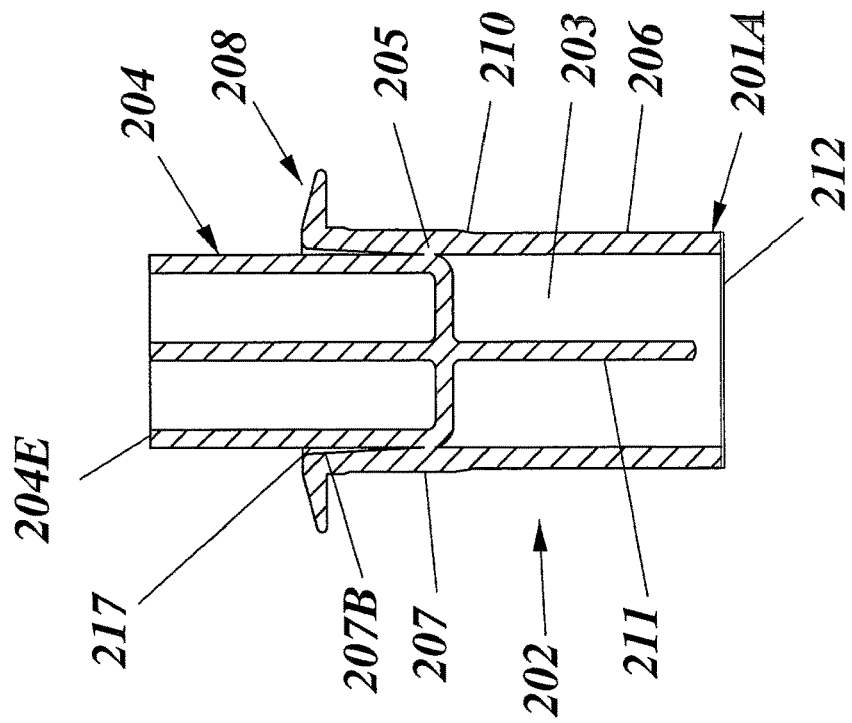
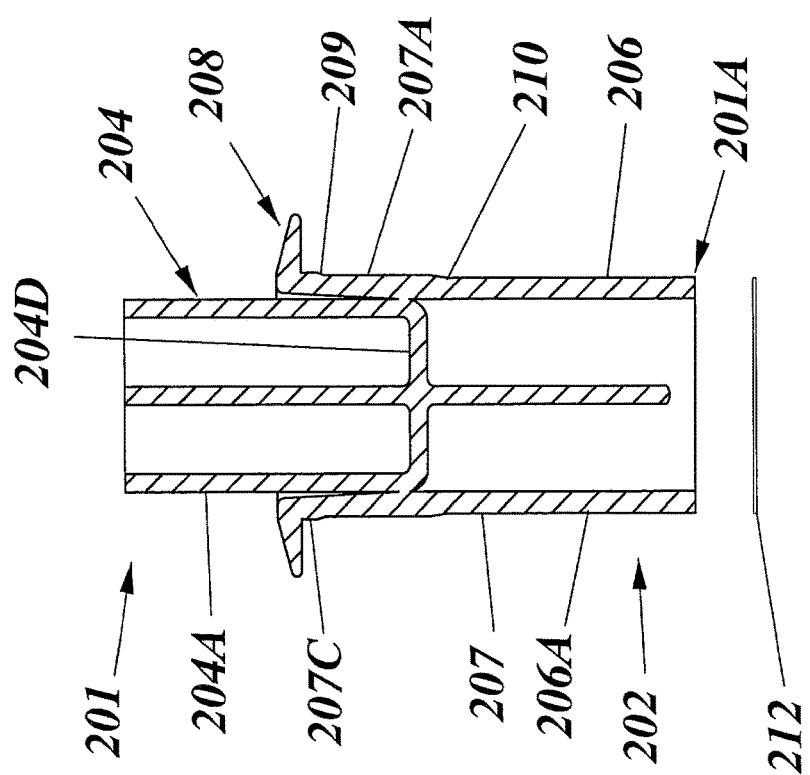
FIG. 5A
FIG. 5B

TREE TREATMENT CAPSULE

TECHNICAL FIELD

This disclosure generally concerns the administering of treatment substance to porous elements in general, such as wood, and in particular to plants, trees etc. by means of a capsule for delivering such substance to the interior of the element.

BACKGROUND

U.S. Pat. Nos. 4,905,410 and 5,485,698 disclose tree treatment capsules including a plug for insertion into an end opening of an internal cavity of a container. The capsule is introduced into a bore formed in a tree, with a protruding end of the plug engaging a bottom of the bore. An impact force is applied to a head element of the plastic container to move the head element towards the plug and break a shank of the container. Chemical agent is released from the cavity when the shank is broken in this way. Generally, the use of these known capsules has advantageous effects and provides good final results, but involves rather time-consuming preparation due not only to the large number of bores required but also to the comparatively strict requirement for appropriate dimensions, especially depth, of the bores formed in the porous elements. EP2066171B1 discloses a capsule providing a container and a plug for insertion into an open rear end of the capsule and for closing the open end to retain treatment substance in a cavity. At the open end the capsule has a stop flange, for abutting an outer wall of a tree etc. when inserted into said bore. At the outer end this capsule has a straight cylindrical wall adjoining the stop flange. Generally, with all prior art solutions within this field it is a matter of great concern to maintain the capsule leak proof outwardly, towards the open end.

SUMMARY

It is a general object to provide a remedy to the discussed problems and concerns within the above indicated field.

In particular it is an object to suggest an improved means for administering treatment substance to porous elements.

In particular it is also an object to suggest an improved method of administering treatment substance to porous elements.

These and other objects are met by embodiments as defined by the accompanying patent claims.

In a first aspect the technology relates generally to a capsule for applying treatment substance to the interior of a porous element. The capsule is adapted for insertion into a bore of the element and has a container with at least one internal cavity for receiving treatment substance therein, an outer stop flange and a plug received in and fixed to the container through a common interconnecting land. In a basic configuration a first container shank portion extends from a first insertion end of the capsule and up to the area of the interconnecting land and has a uniform generally cylindrical shape. A second container shank portion extends away from the first container shank portion, from the area of the interconnecting land towards the outer stop flange. At least at an inner surface thereof the second container shank portion has an outwardly slightly diverging, conical shape. At an outer surface thereof, separated a short distance from the outer stop flange the second container shank portion also has a first circumferential beveled edge serving as a transition to an outer increased diameter section.

In a further aspect the technology relates to an improved method of applying treatment substance to the interior of a porous element and comprising the steps of providing a treatment substance capsule including a container with a releasably closed end, an internal cavity, treatment substance disposed in said internal cavity, and a plug fitted in the container to retain treatment substance in the internal cavity. The method includes forming at least one bore into the interior of the porous element, inserting a tree treatment capsule into the bore and applying driving force to the plug to move it into the cavity. This causes the releasably closed end of the container to open, thereby releasing treatment substance from said internal cavity by permitting it to pass from the internal cavity and into the bore. In a basic configuration the method includes first inserting the capsule with the closed end and a first container shank portion into the bore, acting as a guide and then driving the capsule with the plug further into the bore so that a second container shank portion of the container fits snugly in the bore. Then the capsule with the plug is driven further into the bore so that an outer increased diameter section of the container enters the bore, thereby causing the container increased diameter section and an outer stop flange to be rotated inwardly towards the plug to seal any gap there between.

Essentially, the basic configurations provide the advantage of securing a leak proof cooperation between container and plug during the entire installation process of the capsule. This is accomplished with the different diameter sections of the capsule and its installation phases securing the sealing displacement of the container upper shaft portion and outer stop flange towards and against the plug outer surface.

Advantages offered by this technology, in addition to those described above, will be readily appreciated upon reading the below detailed description of embodiments of the technology.

BRIEF DESCRIPTION OF THE DRAWINGS

The technology, together with further objects and advantages thereof, will be best understood by reference to the following description taken together with the accompanying drawings, in which:

FIG. 5A is a side view illustrating a section through a third embodiment of a capsule for administering treatment substance; and FIG. 5B is a side view of the capsule of FIG. 5A with a bottom seal separate from the capsule.

DETAILED DESCRIPTION

The technology will be explained with reference to exemplifying embodiments thereof that are illustrated in the accompanying drawing figures. The embodiments serve to exemplify the use of the principles of the invention in different applications for administering or supplying a treatment substance, such as a chemical agent, to a porous element, in particular to the phloem layer of a tree. The substance may in such applications for trees be either a herbicide or any other tree destroying agent if the treatment is designed to kill the tree. Otherwise, it may be an insecticide if the treatment is designed for noxious insect control, or a fertilizer, fungicide or other medicant or nutrient if the treatment is designed to cure the tree from a disease or a nutrient deficiency. It shall be emphasized, though that the illustrations serve the purpose of describing preferred embodiments of the technology and are not intended to limit the invention to details thereof The technology may thus also be used for other applications such as the delivery of dye or an impregnation agent in order to change the color or other characteristics of a plant or tree trunk, either living or felled, or any other porous element.

The majority of the prior art solutions of the initially discussed kind, for introducing treatment substance in a porous element such as a tree trunk, are all based on the insertion of a capsule into a bore in the element with an open end of a container first. This open end is temporarily closed by an installed plug. To achieve the desired function the capsule must be introduced into the bore until the plug abuts the bottom of the bore, which requires the formation of a bore with relatively narrow tolerance with regard to its depth. Forming such bores with narrow tolerance is unnecessarily time consuming and undesirable.

In other prior art solutions inadequate security is provided with regard to a possible leakage of treatment solution backwards past the plug and container shank during installation and activation of the capsule. Such leakage problems would be even more serious if liquid treatment solution would be provided in the capsule, which in itself would be a desirable feature.

This technology practically eliminates such shortcomings in the prior art by suggesting a solution that allows for a leakage proof handling and installation of treatment capsules, even when used in combination with a liquid treatment solution.

Figure 1B:
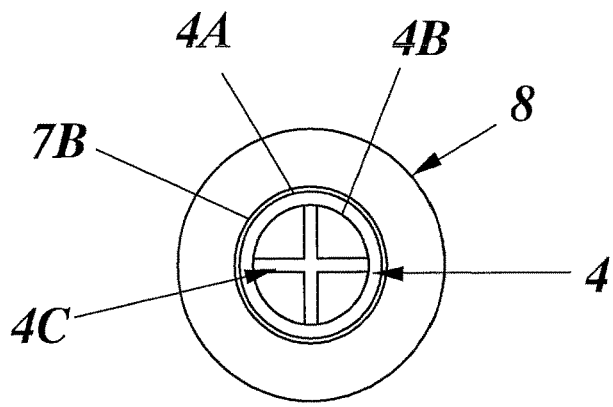
FIG. 1B is a top view of the treatment substance capsule of FIG. 1A.
Figure 1A:
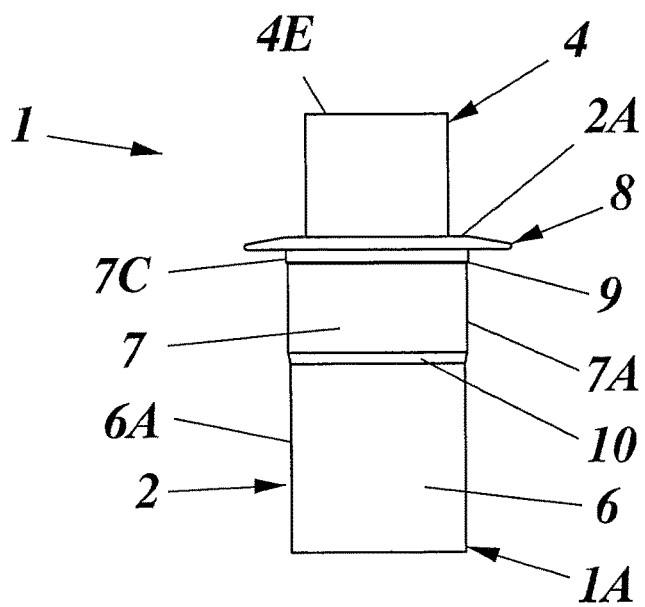
FIG. 1A is a side view illustrating a first embodiment of a capsule for administering treatment substance.
Figure 1C:
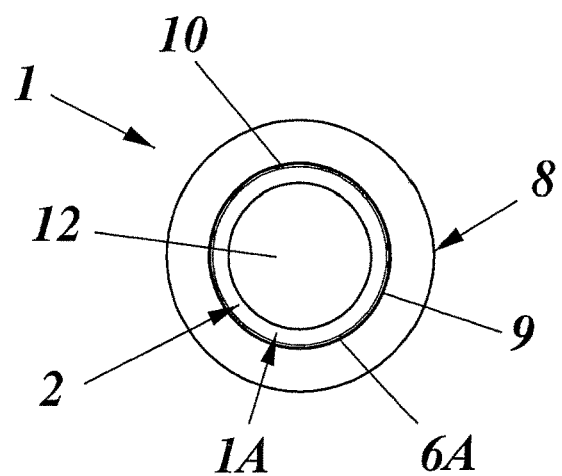
FIG. 1C is a bottom view of the treatment substance capsule of FIG. 1A.
Figure 2:
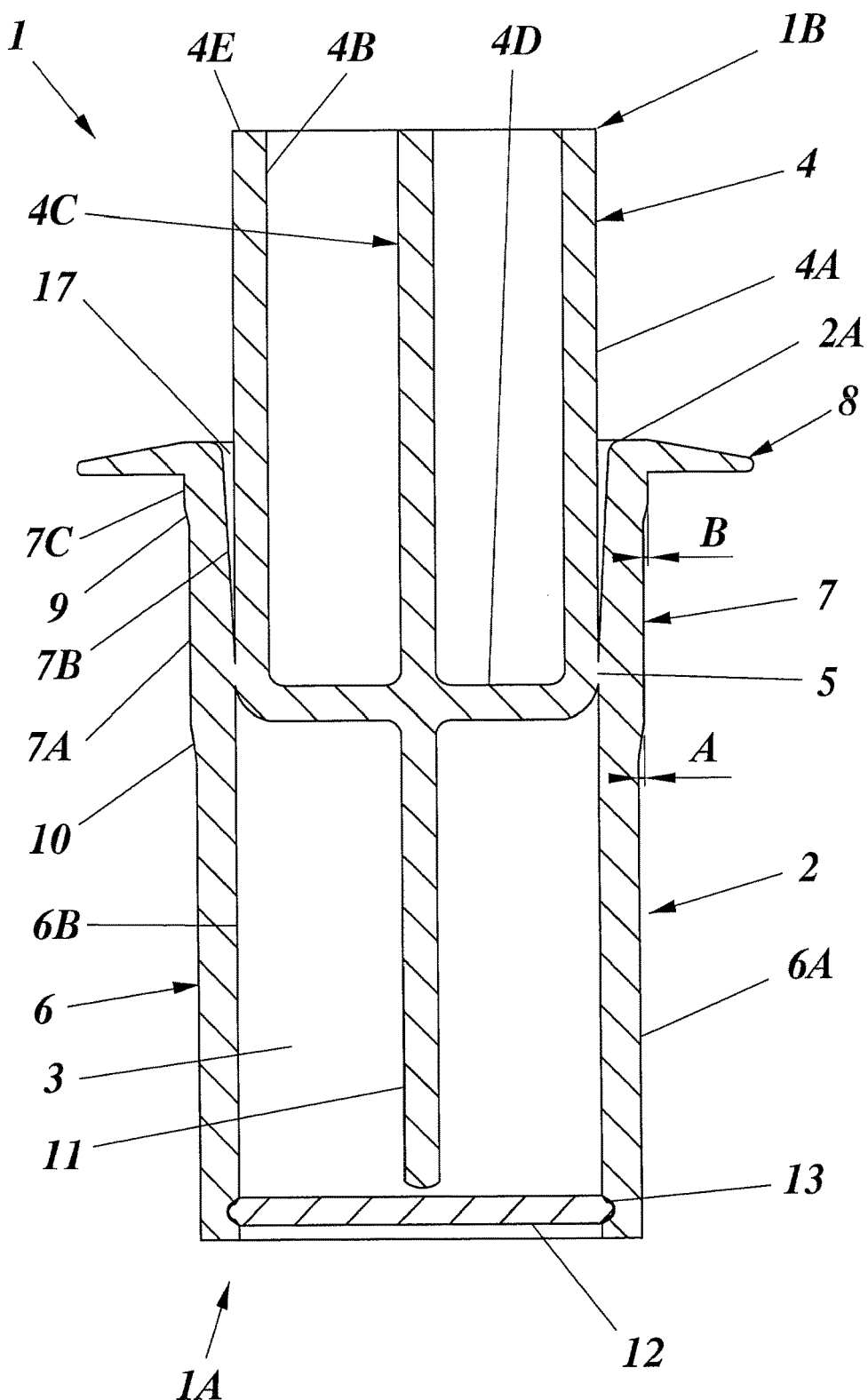
FIG. 2 is a longitudinal section through the treatment substance capsule of FIG. 1A.
Figure 3B:
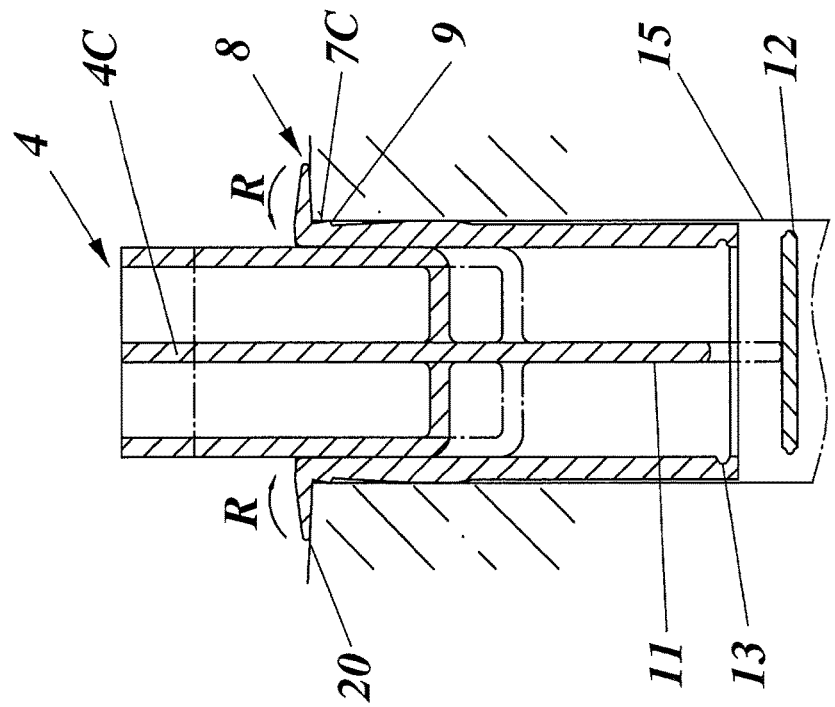
FIG. 3B illustrates in section a final phase of the introduction of the treatment substance capsule of FIG. 1A into a bore formed in a porous element.
Figure 3A:
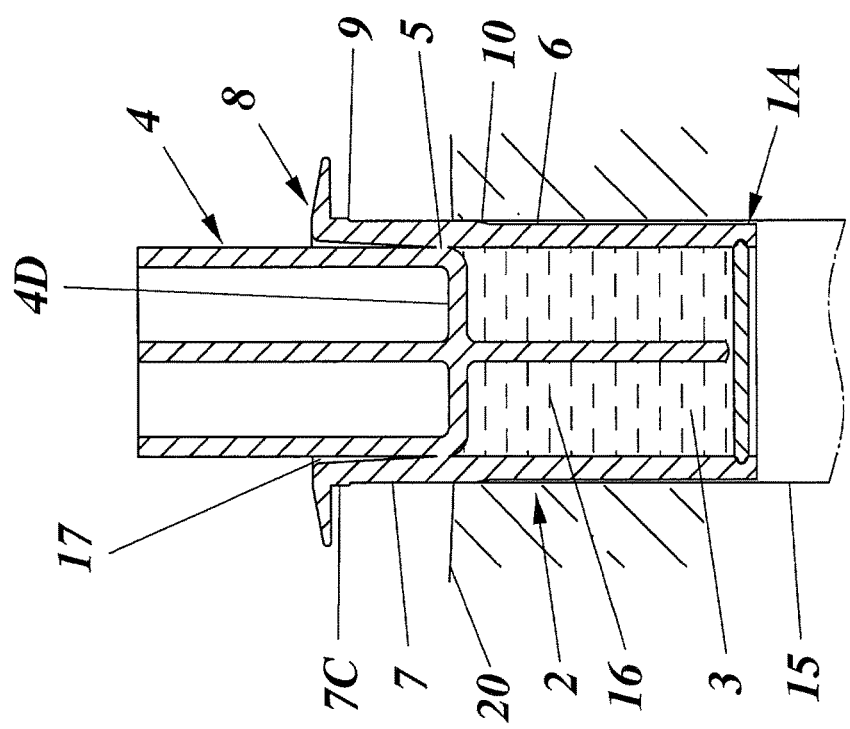
FIG. 3A illustrates in section a first phase of the introduction of the treatment substance capsule of FIG. 1A into a bore formed in a porous element.

A first exemplifying embodiment of the technology is shown in FIGS. 1-3B, wherein the present invention is embodied in a tree treatment capsule 1 that with reference to FIG. 3A-B is adapted for insertion into a predrilled bore 15 formed in a porous element 20, such as in the trunk of a tree, to apply treatment substance 16 (FIG. 3A) to the interior of the element be treated. As is conventional for tree treatment applications the bore 15 extends through the bark and into the phloem layer of the tree 20. The capsule 1 includes a container 2 having a first container shank portion 6 forming at least one internal cavity 3 for receiving treatment substance 16 therein in an assembled condition of the capsule 1.

The capsule 1 further has an outer stop flange 8 and a plug 4 that is received inside the container 2 and is fixed thereto through a common interconnecting land 5 (see FIG. 2). Specifically, an open upper container end 2A has a circular opening for receiving the plug 4. The plug 4 closes the open upper end of the container 2 and retains treatment substance 16 in the internal container cavity 3 with a bottom wall 4D thereof. The plug 4 that is generally cylindrical in shape has at its upper end 4E an impact surface for applying plug driving impact force thereto during activation of the treatment capsule 1. Referring specifically to FIGS. 2 and 3A-B, it is apparent that the plug 4 may preferably be hollow, with a series of, here four, evenly distributed reinforcing ribs 4C.

The ribs 4C cross each other centrally in the plug 4 and are integrally formed with and on a circumferential inner surface 4B thereof to provide a lightweight and yet strongly reinforced structure that will be snugly received within the capsule 1 container 2.

The stop flange 8 acts as an outer stop circumferentially surrounding the upper end 2A of the container for abutting an outer surface of said porous element or tree 20 when the capsule is inserted into said bore 15. Thus, the actual container 2 has an outer diameter that is smaller than the outer diameter of the outer stop flange 8. The outer stop flange 8 in turn that has an outer diameter essentially exceeding the diameter of the bore 15 to present an appropriate positioning support surface.

The first container shank portion 6 extends from a first insertion end 1A of the capsule 1 and approximately to the area of the interconnecting land 5 and has a uniform generally cylindrical shape. A second container shank portion 7 extends away from the container first shank portion 6, approximately from the area of the interconnecting land 5 towards the outer stop flange 8 at the upper end 2A of the container 2. The second container shank portion 7 has an outwardly slightly diverging, conical shape at least at an inner surface 7B thereof. At an outer surface 7A thereof, separated a short distance from the outer stop flange 8, it has a first circumferential beveled edge 9 serving as a transition to an outer increased diameter section 7C. The outer surface 7A as well as the outer increased diameter section 7C of the second container shank portion 7 likewise, each have a uniform generally cylindrical shape.

The plug 4 has the shape of a generally straight cylinder from the at least partially open end portion 4E thereof and down to the area of the interconnecting land 5, leaving a downwardly tapering space 17 between an outer surface 4A of the plug 4 and the inner surface 7B of the second container shank portion 7. The tapering space 17 between the plug 4 outer surface 4A and the second container shank portion 7 inner surface 7B does in combination with the outer increased diameter section 7C of the second container shank portion 7, serve a very essential purpose for obtaining the capsule treatment solution seal, as will be explained below.

A second circumferential beveled edge 10 is provided at the first container shank portion 6, at a position close to the area of the interconnecting land 5 and serves as a transition to the second container shank portion 7. From the first insertion end 1A of the capsule 1 and up to the second beveled edge 10, the container 2 has an outer diameter slightly smaller than the diameter of the bore 15 of the porous element 20 and past the second beveled edge 10 and up to the first beveled edge 9 the container 2 has an outer diameter that is essentially the same as the diameter of the bore 15 in the porous element 20. Past the first beveled edge 9 the container 2 has an outer diameter slightly exceeding the diameter of the bore 15 of the porous element 20.

For practical reasons the bore 15 may in preferred applications be drilled having an approximately 10 mm inner diameter. For such an application the following approximate dimensions would be appropriate for obtaining the purposes of this technology. An outer diameter of the first container shank portion 6, at least in the first insertion end 1A and preferably from said first insertion end 1A and up to the second circumferential beveled edge 10, is approximately 9 mm. An increase A of the container 2 outer diameter at the second beveled edge 10 is in the order of 1 mm and an increase B of the container 2 outer diameter at the first beveled edge 9 is in the order of 0.2-0.3 mm. It shall be emphasized that the dimensions that are given here only serve to exemplify the general relationships. The actual dimensions, both with regard to length and diameter etc. of the bore 15, of the first and second shank portions as well as of the beveled edges may be varied freely for alternative applications. The actual dimensions used do to a great extent depend upon the volume of the sustance to be delivered in different applications.

In the embodiment of FIG. 1-3B the container 2 is initially closed at the first insertion end 1A by a bottom wall 12 that is releasably attached to the container 2 at said closed end. This bottom wall 12 is releasably received in an inner circumferential groove 13 of a container 2 inner shank surface or wall 6B. A central piercing or ejecting member 11 is further provided in the inner cavity 3 of the container 2, extending along a major portion of the cavity 3 and being formed integral with a bottom wall 4D of the plug 4.

The outer stop flange 8 is provided at an upper end of the second container shank portion 7 that connects to the outer increased diameter section 7C and in this embodiment has a uniform, outwardly tapering shape around the entire container 2 outer circumference. Apart from serving as a positioning stop during insertion of the capsule 1 into the porous element 20 the outer stop flange 8 also has the additional purpose of strengthening the container 2 at the upper end 2A of the second container shank portion 7, especially during activation of the capsule 1 by forcing the plug 4 into the container 2, as will be explained below.

It will be understood that the described technology likewise concerns a method of applying treatment substance 16 to the interior of a porous element 20. An embodiment of the method will be described with reference to FIGS. 3A-B and involves providing a treatment substance capsule 1 having a container 2 with a releasably closed end 1A, an internal cavity 3, treatment substance 16 disposed in said internal cavity and a plug 4 fitted in said container to retain the treatment substance 16 in the internal cavity 3. At least one bore 15, one for each capsule 1 to be installed, is first formed into the interior of the element 20. A tree treatment capsule 1 is then inserted into the or each bore 15, whereupon driving force is applied to the plug 4 by means of an appropriate tool, not shown. The applied driving force will move the plug 4 into the cavity 3 and such movement of the plug 4 into the cavity 3 causes the releasably closed end 1A of the container to open, thereby releasing treatment substance 16 from the internal cavity 3 by permitting it to pass from said internal cavity 3 and into said bore 15.

The presently disclosed technology specifically involves first inserting the capsule 1 with the closed end and the first smaller diameter container shank portion 6 into the bore 15, acting as a guide. Then, as the capsule 1 with the plug 4 is driven further into the bore 15, the second, medium diameter container shank portion 7 will fit snugly in the bore 15. The capsule 1 with the plug 4 is then driven further into the bore 15 causing the outer large or increased diameter section 7C of the container 2 to enter the bore 15. This in turn causes the container 2 increased diameter section 7C and the outer stop flange 8 to be rotated inwardly, in the direction of the arrows R in FIG. 3B, towards the plug 4 to seal any gap, such as the provided tapered gap 17, there between. The capsule 1 is maintained in position in the bore 15 by the engagement of the outer stop flange 8 with an outer surface of the porous element 20.

Continued application of driving force to the plug 4 will finally cause the common interconnecting land 5, by which the plug 4 is fixed to the container 2, to break. Then further pushing of the plug 4 into the container 2 cavity 3 will in the illustrated embodiment cause the central ejecting member 11 to eject the releasable bottom wall 12 from the inner groove 13 and from the capsule 1. At that stage the further pushing of the plug 4 will force treatment substance 16 out from the container 2 cavity 3 with the outer stop flange 8 still maintaining the capsule in position through its engagement with the porous element 20.

Figure 4B:
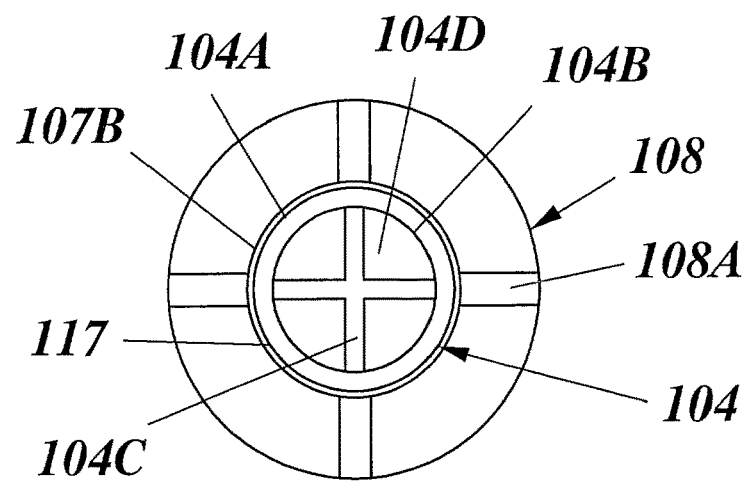
FIG. 4B is a top view illustrating the second embodiment of the capsule of FIG. 4A.
Figure 4A:
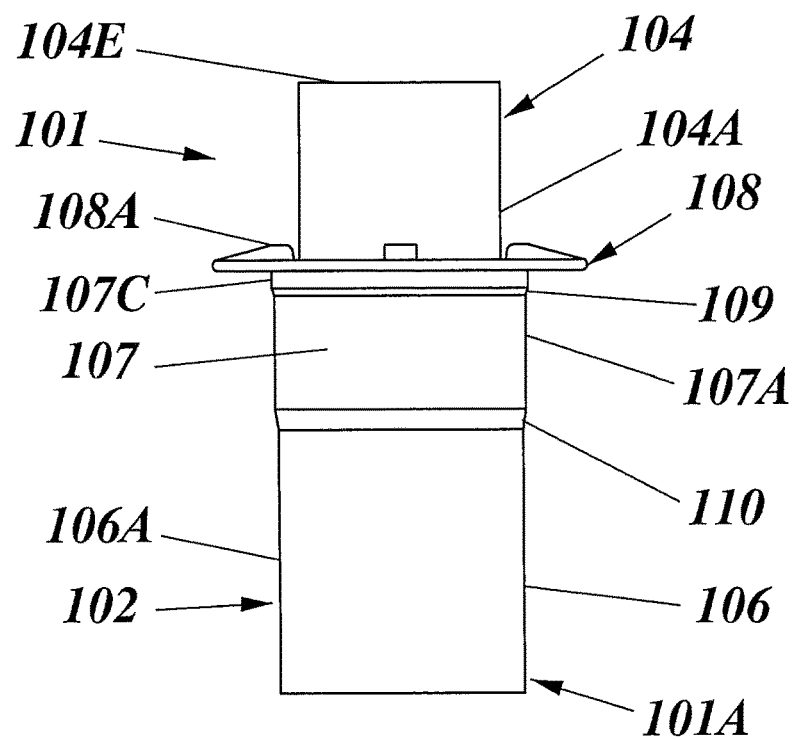
FIG. 4A is a side view illustrating a second embodiment of a capsule for administering treatment substance.

A second embodiment of the capsule 101 of this technology is illustrated in FIG. 4A-B that discloses an alternative, thinner outer stop flange 108 that at regular intervals around the container 102 has upper, individual strengthening beads 108A. In all other respects the capsule 101 is identical with the capsule of the first embodiment. Accordingly, the corresponding parts and sections of the second capsule 101 embodiment are provided with the same reference designations plus 100.

Finally, a third embodiment of the capsule 201 of this technology is illustrated in FIG. 5A-B. In this alternative embodiment a thin sheet or foil 212 is adhered to the container 202 first insertion end 201A. The plug 204 carries a piercing member 211 that during pushing of the plug 204 pierces and/or finally removes the sheet or foil 212 so that treatment fluid may be discharged from the container 202 cavity 203. This third embodiment is based on the structure of the first embodiment so that the corresponding parts and sections of the third capsule 201 embodiment are provided with the same reference designations plus 200.

In another, not specifically shown embodiment that may be preferable for applications requiring multiple treatments, the treatment substance cavity may be divided into multiple compartments. Likewise, the capsule cavity/cavities may be filled with different substances and different types of substances for different applications, such as powders, granules, gels, liquids or other formulations. In a further aspect the capsule of this technology may be varied by the material that it is composed of. For environmental reasons the capsule may preferably be molded from a paper material or other wood fiber material, but may naturally also be molded from a degradeable plastic material Although the technology has been described and illustrated with specific reference to an application for a tree trunk or stump, it shall in no way be restricted to such applications, as indicated above. The basic principles of thereof may be applied to treat other porous elements by impregnation, dying etc.

The present technology has been described in connection with embodiments that are to be regarded as illustrative examples thereof. It will be understood by those skilled in the art that the present technology is not limited to the disclosed embodiments but is intended to cover various modifications and equivalent arrangements. The present technology likewise covers any feasible combination of features described and illustrated herein. The scope of the present technology is defined by the appended claims.

The invention claimed is:

1. A capsule for insertion into a bore of a porous element to apply treatment substance to the interior of the element, the capsule comprising:
   a container with
      at least one internal cavity for receiving treatment substance therein,
      a releasably closed insertion end, and
      an outer stop flange; and
   a plug received in and fixed to the container through a common interconnecting land;
      wherein the container includes a first shank portion extending from the insertion end to the area of the interconnecting land, the first shank portion having a cylindrical shape, and a second shank portion extending away from the first shank portion, from the area of the interconnecting land towards the outer stop flange;

wherein at least an inner surface of the second shank portion has an outwardly diverging, conical shape; and wherein an outer surface of the second shank portion has a first circumferential beveled edge, which is separated from the outer stop flange, serving as a transition to an outer increased diameter section.

2. The capsule according to claim 1, wherein the plug has a cylindrical shape from an at least partially open top portion down to the area of the interconnecting land, such that a downwardly tapering space is provided between an outer surface of the plug and the inner surface of the second shank portion.

3. The capsule according to claim 1, wherein an outer surface of the first shank portion has a second circumferential beveled edge at a position close to the area of the interconnecting land and serving as a transition to the second shank portion.

4. The capsule according to claim 3, wherein the container up to the second beveled edge has an outer diameter that is smaller than the diameter of the bore of the porous element and past the second beveled edge and up to the first beveled edge has an outer diameter that is the same as the diameter of the bore of the porous element.

5. The capsule according to claim 1, wherein the container past the first beveled edge has an outer diameter slightly exceeding the diameter of the bore of the porous element.

6. The capsule according to claim 3, for use with a bore of the porous element having a diameter of approximately 10 mm;

wherein an outer diameter of the first shank portion at least at the insertion end is 9 mm;

wherein an increase of the container outer diameter at the second beveled edge is 1 mm; and wherein an increase of the container outer diameter at the first beveled edge is 0.2-0.3 mm.

7. The capsule according to claim 1, wherein the container is closed at the insertion end by a bottom wall that is releasably attached to the container at the insertion end; and wherein the bottom wall is releasably received in an inner circumferential groove of the container or is adhered to the insertion end.

8. The capsule according to claim 1, wherein a central piercing or ejecting member is provided in the inner cavity of the container, extending along a major portion of the cavity and is formed integral with a bottom wall of the plug.

9. The capsule according to claim 1, wherein the outer stop flange, which has a uniform shape around the entire container or, at regular intervals around the container has upper, individual strengthening beads, is provided at an upper end of the second shank portion connecting to the outer increased diameter section.

10. A method of applying treatment substance to the interior of a porous element, the method comprising:

providing a treatment substance capsule including a container having a releasably closed end, an internal cavity, treatment substance disposed in the internal cavity, and a plug fitted in the container to retain the treatment substance in the internal cavity;

forming at least one bore into the interior of the element;

inserting the capsule into the bore; and applying driving force to the plug to move the plug into the cavity, causing the releasably closed end of the container to open, thereby releasing treatment substance from the internal cavity by permitting it to pass from the internal cavity and into the bore;

wherein the method further involves a) inserting the capsule with the closed end and a first shank portion into the bore, acting as a guide;

b) driving the capsule with the plug further into the bore so that a second shank portion of the container fits snugly in the bore;

the second shank portion at least at an inner surface having an outwardly diverging, conical shape, and at an outer surface, separated from an outer stop flange, having a first circumferential beveled edge serving as a transition to an outer increased diameter section, so that the container past the first circumferential beveled edge has an outer diameter exceeding the diameter of the bore; and c) driving the capsule with the plug further into the bore so that the outer increased diameter section enters the bore, thereby causing the outer increased diameter section and the outer stop flange to be rotated inwardly towards the plug to seal any gap there between; and wherein a), b), and c) are performed in sequential order.

11. The method according to claim 10, wherein continued application of driving force to the plug, finally causing a common interconnecting land, by which the plug is fixed to the container, to break, by further pushing the plug into the container cavity to cause a central piercing or ejecting member to pierce or eject a releasable bottom wall from the capsule, whereby further pushing of the plug will force treatment substance out from the container cavity with the outer stop flange still maintaining the capsule in position through its engagement with the porous element.

12. A capsule for insertion into a bore of a porous element to apply treatment substance to the interior of the element, the capsule comprising:

a container with at least one internal cavity for receiving treatment substance therein, an insertion end, and an end with a stop flange; and a plug received in and fixed to the container through a common interconnecting land;

wherein the container includes a first shank portion extending from the insertion end, the first shank portion having a cylindrical shape, and a second shank portion extending from the first shank portion towards the stop flange;

wherein at least an inner surface of the second shank portion has an outwardly diverging, conical shape, such that a tapered gap is provided between the second shank portion and the plug; and wherein an outer surface of the second shank portion has a first circumferential beveled edge, which is located between the stop flange and the first shank portion.

* * * * *